United States Patent
Partyanko et al.

[15] 3,654,997
[45] Apr. 11, 1972

[54] ROOT HARVESTER

[72] Inventors: Andrei Ivanovich Partyanko, ulitsa Zhikhorskaya, 49, kv. 2, Kharkov; Valentin Andreevich Lastovenko, ulitsa Lermontovskaya, II, kv. 3, Kharkov; Viktor Vasilievich Dudka, prospekt Gargarina, 201, Kharkov; Fedor Leontievich Rodenko, poselok Zhikhor, pereulok Tsiolkovskogo 4, Kharkov; Grigory Ivanovich Onischenko, ulitsa Karavaeva, 15, kv. 17, Dnepropetrovsk; Adolf Senenovich Vatkin, prospekt Karla Marxa, 81, kv. 3, Dnepropetrovsk; Alexei Alexandrovich Pokusa, ulitsa Artema, 28, kv. 36, Dnepropetrovsk; Ivan Mikhailovich Ruzin, ulitsa Fabrika, 27, Dnepropetrovsk, all of U.S.S.R.

[22] Filed: Nov. 4, 1970

[21] Appl. No.: 86,889

[52] U.S. Cl. .................................................. 171/58
[51] Int. Cl. ............................................... A01d 17/06
[58] Field of Search ........................... 171/58, 55, 61, 62

[56] References Cited

UNITED STATES PATENTS

| 2,944,611 | 7/1960  | Rollins | 171/58 |
| 2,972,383 | 2/1961  | Erdman  | 171/58 |
| 3,010,522 | 11/1961 | Oppel   | 171/58 |

*Primary Examiner*—Antonio F. Guida
*Attorney*—Waters, Roditi, Schwartz & Nissen

[57] ABSTRACT

A root harvester having separating tools located directly following dig-out tools and consisting of two rows installed one above the other, the separating tools of the first row being in the form of two pairs of coaxial rotating auger screws, each pair being threaded in different directions.

4 Claims, 3 Drawing Figures

ROOT HARVESTER

The present invention relates to root harvesting machines adapted for two-phase harvesting of sugar beet.

Known in the art is a root harvester comprising dig-out tools being followed by front-mounted separating tools for cleaning roots, said separating tools located close to conveying devices also included in or associated with the harvester.

Practical experience has shown that the known harvester fails to insure satisfactory cleaning of roots with respect to vegetable trash and dirt.

An object of our invention resides in providing a root harvester with improved separating tools insuring complete cleaning of dirt and vegetable trash from roots.

To achieve the above and other objects of the invention, there is provided a root harvester comprising dig-out tools followed by front-mounted separating tools for cleaning roots, the latter being located close to the conveying means. According to the invention, the separating tools are installed in two rows, one above the other, and are interconnected by conveyors, the separating tools of the first row being made in the form of two coaxial parts of rotating auger screws, each pair of these screws being made with an opposite spiral direction to insure separation and conveyance of the processed mass in two counter-opposed flows to the intermediate conveying devices.

Installed in the machine of the invention above the last of the auger screws (in the direction of mass flows) are two rotating rolls, one of the rolls being plain and the other being threaded; said rolls are installed one above the other and their diameter is smaller than that of the auger screws.

In a preferred embodiment of the invention the discharge sections of the intermediate conveyors are arranged above the separating tools of the second row.

Installation of the separating tools directly after the dig-out tools in the root harvester, according to the invention, makes it possible to improve cleaning fine dirt and vegetable trash from harvested roots.

Division of the root mass into two flows by the separating tools of the first row allows said mass to be dispersed and processed more efficiently.

By lengthening the cleaning route due to the passage of the mass through the separating tools of the first and second rows, complete cleaning of the roots is insured while the two-row arrangement of the separating tools adds to compactness of the machine. To facilitate an understanding of the invention, a preferred embodiment next will be described in detail by way of example with reference to the accompanying drawings in which.

Figure 1:
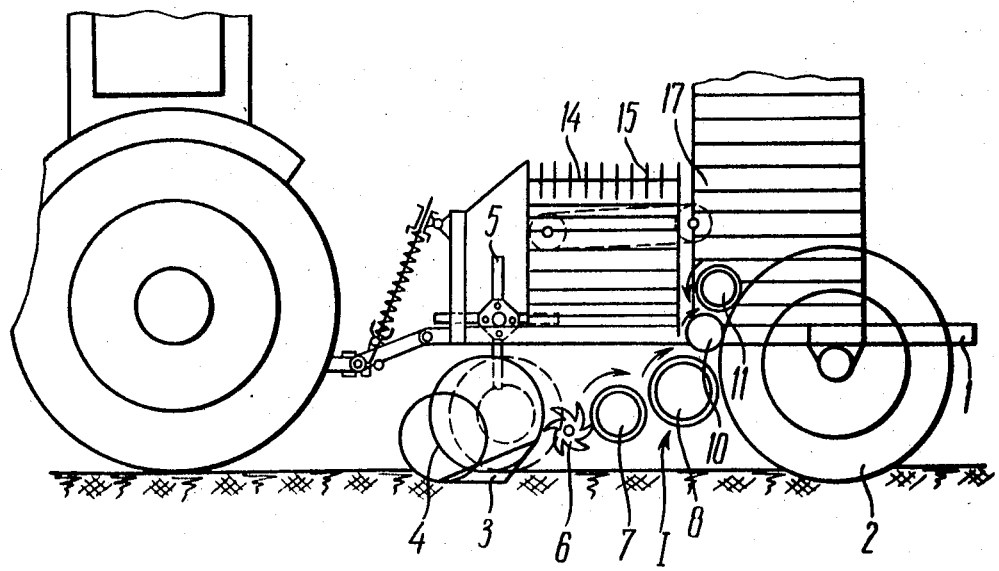
FIG. 1 illustrates a sectional side view of a root harvester provided in accordance with one embodiment of the invention.

The root harvester in the drawing comprises a frame 1 mounted on wheels 2. Located at the front end of the harvester and on the frame 1 are the dig-out tools in the form of alternating shares 3 and rotating discs 4 and a beater feeder 5 rotating adjacent the dig-out tools and adapted to deliver a root mass together with dirt and vegetable trash onto separating tools to be described below.

Installed after the dig-out tools is a camshaft 6 adapted to crumble any dirt delivered with the roots and to convey the bulk roots to the separating tools.

Installed after the camshaft 6, frontally to the dig-out tools and horizontally to the row of roots are separating tools consisting of two rows I and II arranged one above the other.

The separating tools of row I consist of two pairs of auger screws 7,8, each pair being of the same diameter but threaded in opposite directions which insure conveyance of the root mass in two counter-opposed flows to the intermediate conveyors 9.

Installed above each auger screw and one above the other are two rotating shafts 10 and 11. Shaft 10 is plain while the shaft 11 is threaded.

The diameters of the shafts 10, 11 are smaller than that of the auger screws 7, 8. This insures efficient cleaning of dirt and vegetable trash from the roots due to the difference between the peripheral speeds of the auger screw 8 and shaft 10 rotating in one and the same direction.

Figure 2:
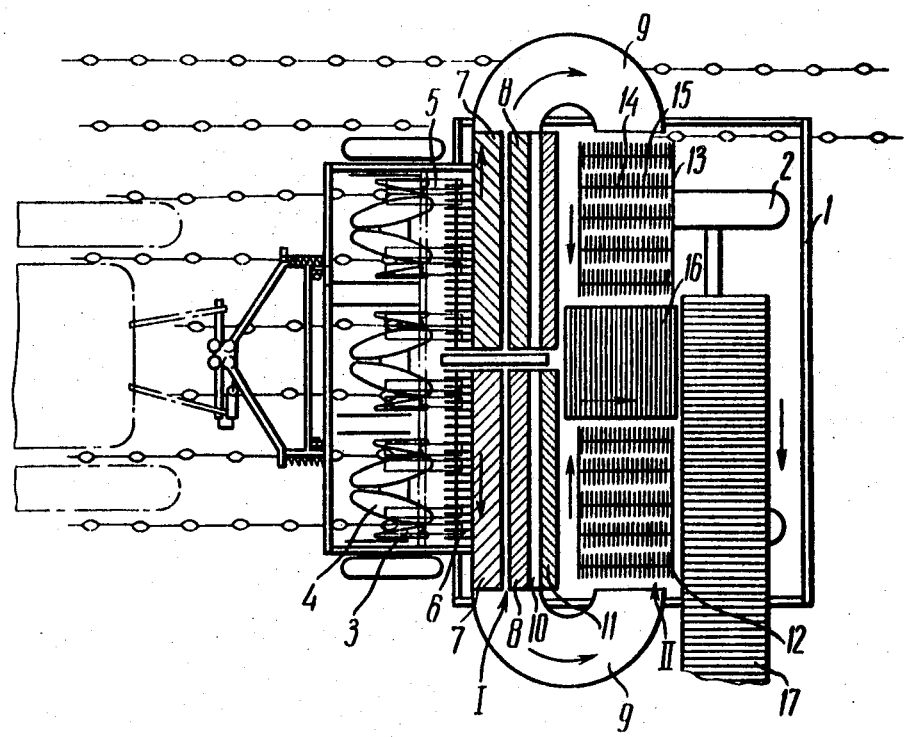
FIG. 2 is a top view of the harvester of FIG. 1.
Figure 3:
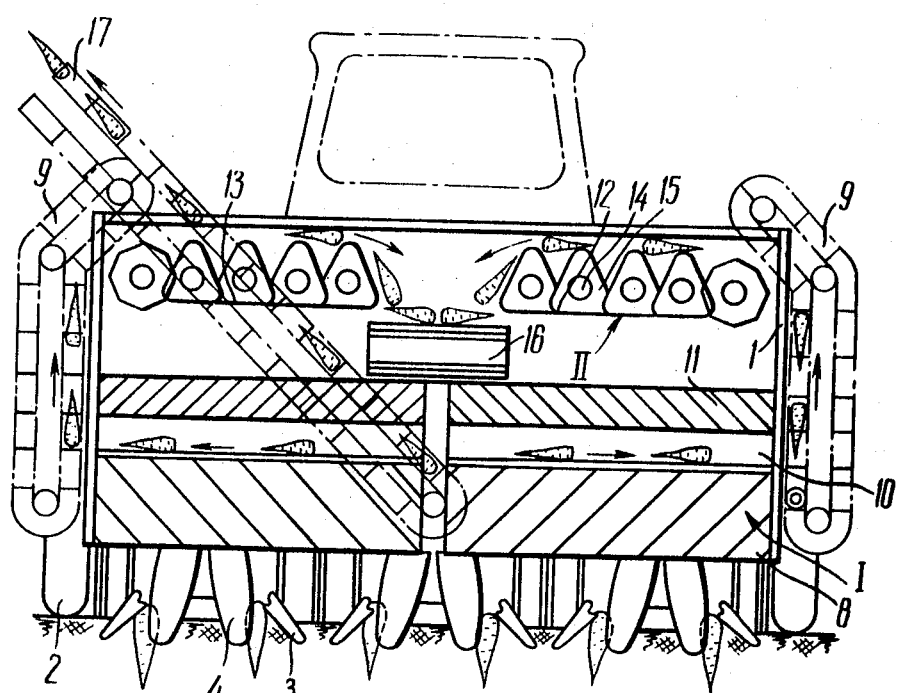
FIG. 3 is a rear view of the harvester of FIG. 1.

The separating tools of row II consist of two kicker-roll cleaners 12,13 (FIGS. 2,3) made in the form of shafts 14 with a set of three-lobe cams 15.

The shafts of the cleaner 12 (FIG. 3) are driven counter-clockwise whereas those of the cleaner 13 are driven in clockwise direction. This insures two flows of the root mass, these flows moving in opposite directions towards each other. Other arrangements of the separating tools in row II are also feasible.

The separating tools of rows I and II are interconnected by said intermediate conveyors 9 (FIG. 3) whose discharge sections are located above the separating tools of row II while their inlets adjoin the auger screws 7 and 8. Conveyors 9 can be of any of the known types of conveyors.

In the middle of the separating tools of row II is installed a longitudinal conveyor 16 (FIGS. 2,3) for delivering roots onto the loading conveyor 17 which dumps the roots into associated transport facilities (not shown).

The root harvester operates as follows.

The roots together with dirt and vegetable trash are dug out by the digging tools made in the form of rotating discs 4 and shares 3 and delivered by the beater-feeders 5 and the camshaft 6 onto the two pairs of auger screws 7 and 8 and shafts 10, 11 where they are divided into counter-opposed flows and frictionally cleaned of dirt and trash. They are then shifted through the gaps between the auger screws 7, 8 and shafts 10, 11.

The root mass moved by the threads of the rotating auger screws 7, 8 is delivered to the intermediate conveyors 9 which deliver the root mass to the kicker-roll cleaners and clod breakers 12,13 where the roots are finally cleaned of the remaining solid soil clods which are crushed and fall down through the gaps between the cams 15.

The cleaned roots moving in two flows towards each other over the separating tools of row II are delivered onto the longitudinal conveyor 16 and further onto the loading conveyor 17 which dumps them into the transport facilities moving beside the harvester.

We claim:

1. A root harvester comprising: dig-out tools adapted for the digging out of a root mass including roots, dirt and vegetable trash; two rows of separating tools for cleaning the roots and separating the dirt and trash therefrom, said rows being arranged one above the other and frontally with relation to said dig-out tools; said separating tools of the first row containing two pairs of coaxial rotating auger screws with opposite spiralling to insure separation and conveyance of the roots in two counter-opposed flows; an intermediate conveyor interconnecting the first and second rows of the separating tools; and conveying devices adjacent the separating tools of the second row to receive roots therefrom.

2. A root harvester according to claim 1 in which the second row includes a plain roll and a threaded roll whose diameter is smaller than that of the auger screws and which are installed above the last of the auger screws in the direction of mass flow and arranged one above the other.

3. A root harvester according to claim 1 wherein the intermediate conveyors have discharge sections located above the separating tools of the second row.

4. A root harvester as claimed in claim 1 wherein the tools of said second row include lobed cams arranged in groups having parallel axes and adapted for feeding roots towards one of said conveying devices which is arranged between the groups.

* * * * *